United States Patent [19]

Cantatore et al.

[11] 4,238,388
[45] Dec. 9, 1980

[54] DERIVATIVES OF 1,3,5-TRIAZACYCLOHEPTANE-2,4-DIONE AND THEIR USE AS POLYMER STABILIZERS

[75] Inventors: Giuseppe Cantatore, Casalecchio di Reno; Paolo Cassandrini, Bologna, both of Italy

[73] Assignee: Chimosa Chimica Organica S.p.A., Pontecchio Marconi, Italy

[21] Appl. No.: 50,207

[22] Filed: Jun. 20, 1979

[30] Foreign Application Priority Data

Jun. 20, 1979 [IT] Italy .................................. 24744 A/78

[51] Int. Cl.³ ....................... C07D 401/14; C08K 5/34
[52] U.S. Cl. ......... 260/45.8 N; 260/239.3 R; 546/187
[58] Field of Search .................... 260/239.3 R, 45.8 N, 260/45.8 NB, 48.8 NP; 546/187

[56] References Cited

U.S. PATENT DOCUMENTS 3,878,199  4/1975  Beale ............................. 260/239.3 R

OTHER PUBLICATIONS

Chemical Abstracts, vol. 86 (1977), item 43755 to abstracting Polish Patent 84,508, May 20, 1976.

*Primary Examiner*—John D. Randolph
*Assistant Examiner*—Robert T. Bond

[57] ABSTRACT

New compounds are disclosed comprised in the formula

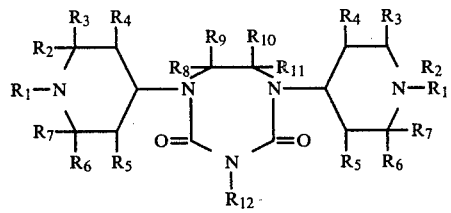

where $R_1$, $R_2$, $R_3$, $R_4$, $R_5$, $R_6$, $R_7$, $R_8$, $R_9$, $R_{10}$, $R_{11}$, $R_{12}$ are as defined in the specification and which have been found highly useful as stabilizers for polymers.

Also the process for the preparation of the above new compounds is described.

14 Claims, No Drawings

DERIVATIVES OF 1,3,5-TRIAZACYCLOHEPTANE-2,4-DIONE AND THEIR USE AS POLYMER STABILIZERS

This invention relates to new piperidine compounds in the form of derivates of 1,3,5-triazacycloheptane-2,4-dione, the process for their preparation and their use as stabilisers against light, heat and oxidation for synthetic polymers. More precisely, this invention relates to new compounds of formula

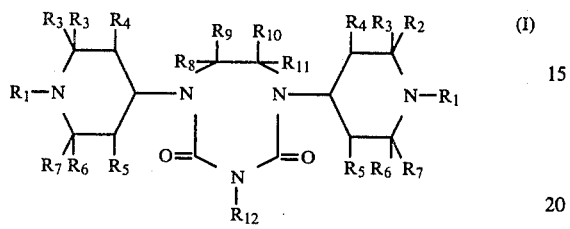

in which:

$R_1$, $R_{12}$, which can be equal or different, represent —O, —CN, hydrogen, a linear or branched alkyl containing 1 to 20 carbon atoms, an alkenyl or alkinyl containing 2 to 20 carbon atoms, benzyl, benzyl substituted by 1 to 3 alkyls containing 1 to 4 carbon atoms, hydroxybenzyl, hydroxybenzyl substituted by 1 to 3 alkyls containing 1 to 4 carbon atoms; a —$COR_{15}$, —$COOR_{15}$ or —$CONR_{15}R_{16}$ radical in which $R_{15}$, $R_{16}$, which can be equal or different, represent a linear or branched alkyl containing 1 to 20 carbon atoms, an alkenyl containing 2 to 20 carbon atoms, a cycloalkyl containing 5 to 12 carbon atoms, an aryl containing 6 to 12 carbon atoms an aralkyl containing 7 to 13 carbon atoms, or when bonded to N they can be hydrogen, or together with the N to which they are bonded they can form a nitrogenous heterocyclic ring of 5 to 8 terms; or a

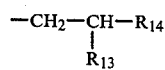

radical in which $R_{13}$ is hydrogen, methyl or phenyl and $R_{14}$ is —OH, —CN,

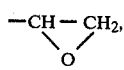

—$OR_{15}$, —$COOR_{15}$, —$COR_{15}$, —$OCOR_{15}$, —$CONR_{15}R_{16}$, —$OCONR_{15}R_{16}$, —$NR_{15}R_{16}$ in which $R_{15}$ and $R_{16}$ are as heretofore defined:

$R_2$, $R_3$, $R_6$, $R_7$, which can be equal or different, represent an alkyl containing 1 to 6 carbon atoms;

$R_4$, $R_5$, which can be equal or different, represent hydrogen or an alkyl containing 1 to 6 carbon atoms;

$R_8$, $R_9$, $R_{10}$, $R_{11}$, which can be equal or different, represent hydrogen or an alkyl containing 1 to 6 carbon atoms.

The following can be indicated as particular examples of the various radicals:

For $R_1$, $R_{12}$: hydrogen, methyl, ethyl, n-propyl, n-butyl, isobutyl, n-hexyl, n-octyl, n-decyl, n-dodecyl, n-octadecyl, allyl, 2-butenyl, 10-undecenyl, oleyl, propargyl, benzyl, 4-methylbenzyl, 4-tert-butylbenzyl, 4-hydroxybenzyl, 3,5-di-tert-butyl-4-hydroxybenzyl, and when they are represented by a

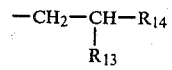

radical, then $R_{13}$ could in particular be hydrogen, methyl or phenyl, and $R_{14}$ could in particular be —OH, —CN or

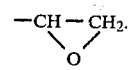

Examples of $R_{15}$, $R_{16}$ are methyl, ethyl, n-propyl, n-butyl, n-hexyl, n-octyl, n-decyl, n-dodecyl, allyl, 2-butenyl, 10-undecenyl, oleyl, cyclohexyl, 2- or 4-methylcyclohexyl, 3,3,5-trimethylcyclohexyl, phenyl, 2- or 4-methylphenyl, 2,4- or 2,6-dimethylphenyl, 4-tert-butylphenyl, benzyl, 4-methylbenzyl, 4-tert-butylbenzyl, or when bonded to an N they can be hydrogen or pyrrolidinyl, piperidinyl, morpholinyl, piperazinyl, N-methylpiperazinyl, homopiperazinyl, or N-methylhomopiperazinyl.

Preferred examples of $R_2$, $R_3$, $R_6$, $R_7$ are methyl or ethyl, and $R_4$, $R_5$ are preferably hydrogen or methyl. Particularly preferred combinations are: (a) $R_2$, $R_3$, $R_6$, $R_7$=methyl, $R_4$, $R_5$=hydrogen; (b) $R_2$, $R_4$, $R_6$=methyl, $R_3$, $R_7$=ethyl, $R_5$=hydrogen.

$R_8$, $R_9$, $R_{10}$, $R_{11}$ are preferably hydrogen or methyl.

The new derivatives of 1,3,5-triazacycloheptane-2,4-dione as heretofore defined are prepared according to the present invention by reacting a N,N'-bis(polyalkyl-4-piperidyl) ethylenediamine of formula:

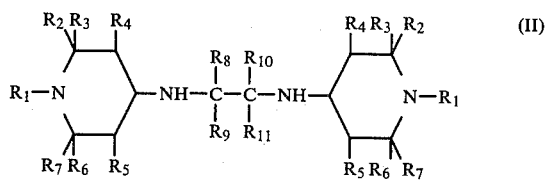

in which $R_1$, $R_2$, $R_3$, $R_4$, $R_5$, $R_6$, $R_7$, $R_8$, $R_9$, $R_{10}$, $R_{11}$ are as heretofore defined, with urea or biuret. If urea is used, the molar ratio of compounds of formula II to urea lies between 1:3 to 1:1.5, and preferably between 1:2.25 and 1:1.75. If biuret is used, the molar ratio of compounds of formula II to biuret lies between 1:1.25 and 1:0.75, and preferably between 1:1.1 and 1:0.9.

The reaction can be carried out either with or without solvent, at a temperature of 50° to 250° C., preferably 100° to 200° C., and at a pressure of 0.5 to 10 atmospheres. The reaction solvent used can be an organic inert solvent such as dimethylformamide, dimethylacetamide, dimethylsulphoxide, chlorobenzene, dichlorobenzene, n-butanol, n-pentanol, n-hexanol, 2-ethoxyethanol, 2-butoxyethanol, ethyleneglycol, toluene, xylene, ethylbenzene, diethylbenzene or decahydronaphthalene.

By reacting bispiperidylamines of formula II with urea or biuret, compounds are obtained of formula:

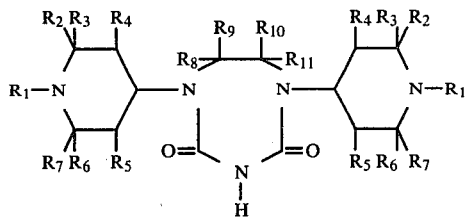

in which $R_1$, $R_2$, $R_3$, $R_4$, $R_5$, $R_6$, $R_7$, $R_8$, $R_9$, $R_{10}$, $R_{11}$ are as heretofore defined.

The products III can be the final products according to the invention, if it is required to obtain compounds where $R_{12} = H$.

It is required to obtain products I in which $R_{12}$ is other than hydrogen, the compounds III are reacted with a compound of formula $X-R_{12}$ (IV), in which $R_{12}$ has any of the aforesaid meanings with the exception of hydrogen, and X is a halogen, preferably Cl, Br or I.

If $R_1$ is other than H in compound III, then the substitution can take place only on the imido NH of the cycloheptane ring.

If $R_1 = H$ in compound III, then different operating methods have to be used according to whether it is required to introduce equal radicals in the three available NH groups, or introduce a radical only in the imido NH.

In the first case, fairly severe reaction conditions and very energetic reagents are used, i.e. compounds of formula IV in which X is a very reactive halogen.

For selectively substituting only the imido group in the cycloheptane ring, more gentle conditions are used, together with less reactive compounds of formula IV.

The compounds of formula II, which are the starting substances for the process according to the present invention, are prepared using the process described in U.S. Pat. No. 3,480,635 by the reductive alkylation of diamines

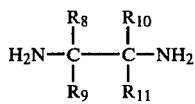

with polyalkyl-4-piperidones of formula

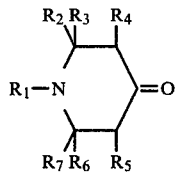

in the presence of hydrogen, and of platinum as catalyst.

According to an alternative embodiment of the present process, when $R_1 = R_{12} = H$ in the compounds III, it is possible to introduce the methyl radical only in the piperidine NH's by means of the Eschweiler-Clarke reaction (Organic Reactions Vol. V—page 307, Wiley & Sons 1962). Preferred examples of compounds according to the present invention are:

1,5-bis(2,2,6,6-tetramethyl-4-piperidyl)-1,3,5-triazacycloheptane-2,4-dione 1,5-bis(2,2,6,6-tetramethyl-4-piperidyl)-6-methyl-1,3,5-triazacycloheptane-2,4-dione 1,5-bis(1,2,2,6,6-pentamethyl-4-piperidyl)-1,3,5-triazacycloheptane-2,4-dione 1,5-bis(1,2,2,6,6-pentamethyl-4-piperidyl)6-methyl-1,3,5-triazacycloheptane-2,4-dione 1,5-bis(1-ethyl-2,2,6,6-tetramethyl-4-piperidyl)-1,3,5-triazacycloheptane-2,4-dione 1,5-bis(2,6-diethyl-2,3,6-trimethyl-4piperidyl)-1,3,5-triazacycloheptane-2,4-dione 1,5-bis(2,6-diethyl-1,2,3,6-tetramethyl-4-piperidyl)-1,3,5-triazacycloheptane-2,4-dione 1,5-bis(1-n-propyl-2,2,6,6-tetramethyl-4-piperidyl)-1,3,5-triazacycloheptane-2,4-dione 1,5-bis(1-n-butyl-2,2,6,6-tetramethyl-4-piperidyl)-1,3,5-triazacycloheptane-2,4-dione 1,5-bis(1-n-butyl-2,2,6,6-tetramethyl-4-piperidyl)-6-methyl-1,3,5-triazacycloheptane-2,4-dione 1,5-bis(1-n-hexyl-2,2,6,6-tetramethyl-4-piperidyl)-1,3,5-triazacycloheptane-2,4-dione 1,5-bis(1-n-octyl-2,2,6,6-tetramethyl-4-piperidyl)-1,3,5-triazacycloheptane-2,4-dione 1,5-bis(1-benzyl-2,2,6,6-tetramethyl-4-piperidyl)-1,3,5-triazacycloheptane-2,4-dione 1,5-bis(1-ethoxycarbonylmethyl-2,2,6,6-tetramethyl-4-piperidyl)-1,3,5-triazacycloheptane-2,4-dione 1,5-bis(1(2-hydroxyethyl)-2,2,6,6-tetramethyl-4-piperidyl)-1,3,5-triazacycloheptane-2,4-dione 1,5-bis(1(2-cyanoethyl)-2,2,6,6-tetramethyl-4-piperidyl)-1,3,5-triazacycloheptane-2,4-dione 1,5-bis(1-acetyl-2,2,6,6-tetramethyl-4-piperidyl)-1,3,5-triazacycloheptane-2,4-dione 1,5-bis(1-acetyl-2,2,6,6-tetramethyl-4-piperidyl)-6-methyl-1,3,5-triazacycloheptane-2,4-dione 1,5-bis(2,2,6,6-tetramethyl-4-piperidyl)-3-methyl-1,3,5-triazacycloheptane-2,4-dione 1,5-bis(2,2,6,6-tetramethyl-4-piperidyl)-3-ethyl-1,3,5-triazacycloheptane-2,4-dione 1,5-bis(2,2,6,6-tetramethyl-4-piperidyl)-3-n-butyl-1,3,5-triazacycloheptane-2,4-dione 1,5-bis(1,2,2,6,6-pentamethyl-4-piperidyl)-3-methyl-1,3,5-triazacycloheptane-2,4-dione 1,5-bis(1,2,2,6,6-pentamethyl-4-piperidyl)-3,6-dimethyl-1,3,5-triazacycloheptane-2,4-dione 1,5-bis(1,2,2,6,6-pentamethyl-4-piperidyl)-3-n-butyl-1,3,5-triazacycloheptane-2,4-dione 1,5-bis(1-n-butyl-2,2,6,6-tetramethyl-4-piperidyl)-3-n-butyl-1,3,5-triazacycloheptane-2,4-dione A detailed description is given hereinafter of the process for preparing some of the aforesaid compounds, by way of non-limiting example only

EXAMPLE 1

338 g (1 mole) of N,N'-bis(2,2,6,6-tetramethyl-4-piperidyl) ethylenediamine, 120 g (2 moles) of urea and 500 ml of dimethylformamide are heated under a slight nitrogen current for two hours at 130° C. and then for 16 hours at 140°–145° C.

On cooling to ambient temperature, a crystalline precipitate is obtained which is separated by filtration, washed with a little acetone, dried and recrystallised from ethanol. A compound is obtained of formula:

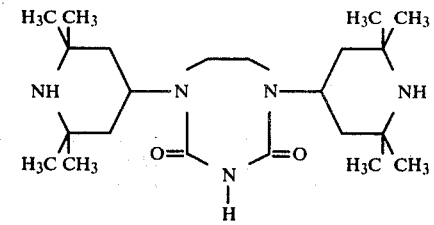

M.P. 270°–274° C.

Analysis for $C_{22}H_{41}N_5O_2$. Calculated: C 64.83%; H 10.14%; N 17.18%. Found: C 64.61%; H 10.21%; N 17.06%

1,5-bis(2,2,6,6-tetramethyl-4-piperidyl)-6-methyl-1,3,5-triazacycloheptane-2,4-dione having an M.P. of 305°–308° C. was prepared in the same manner.

EXAMPLE 2

The product described in Example 1 is prepared by heating 338 g (1 mole) of N,N'-bis(2,2,6,6-tetramethyl-4-piperidyl) ethylenediamine, 103 g (1 mole) of biurer and 500 ml of dimethylformamide for 10 hours at 140°–145° C.

After crystallising from ethanol, the product obtained has an M.P. of 271°–274° C.

EXAMPLE 3

40.7 g (0.1 moles) of 1,5-bis(2,2,6,6-tetramethyl-4-piperidyl)-1,3,5-triazacycloheptane-2,4-dione prepared as in Example 1, 50 ml of 85% formic acid and 100 ml of 37% formaldehyde are heated under reflux for 8 hours.

After cooling to ambient temperature, the reaction mixture is diluted with 200 cc of water and alkalised with 10% aqueous NaOH.

The precipitate obtained is separated by filtration, washed with water, dried and crystallised from methanol.

A compound is obtained of formula:

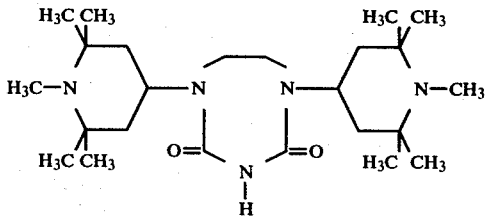

M.P. 248°–251° C.

Analysis for $C_{24}H_{45}N_5O_2$. Calculated: C 66.17%; H 10.41%; N 16.07%. Found: C 65.92%; H 10.32%; N 15.95%.

EXAMPLE 4

40.7 g (0.1 moles) of 1,5-bis(2,2,6,6-tetramethyl-4-piperidyl)-1,3,5-triazacycloheptane-2,4-dione, 70.95 g (0.5 moles) of methyl iodide, 250 ml of xylene, 40 g of 50% aqueous sodium hydrate and 3.5 g of lauryl-dimethylbenzylammonium chloride are heated under reflux for 5 hours. 20 ml of water are added to the reaction mixture, the aqueous layer is separated, it is made completely anhydrous by azeotrope formation, is filtered hot and is cooled.

The crystalline precipitate obtained is separated by filtration and recrystallised from acetone.

A compound is obtained of formula:

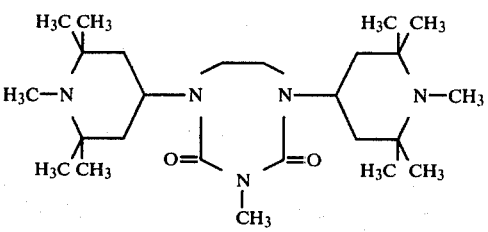

M.P. 201°–203° C.

Analysis for $C_{25}H_{47}N_5O_2$. Calculated: C 66.77%; H 10.53%; N 15.57%. Found: C 66.41%; H 10.68%; N 15.45%.

EXAMPLE 5

40.7 g (0.1 moles) of 1,5-bis(2,2,6,6-tetramethyl-4piperidyl)-1,3,5-triazacycloheptane-2,4-dione, 20.55 g (0.15 moles) of n-butylbromide; 250 ml of xylene, 40 g of 50% aqueous sodium hydrate and 3.5 g of lauryl-dimetylbenzylammonium chloride are heated under reflux for 6 hours.

20 ml of water are added to the reaction mixture, the aqueous layer is separated and the organic phase is evaporated to dryness. The waxy residue obtained is crystallised from n-hexane. A compound is obtained of formula:

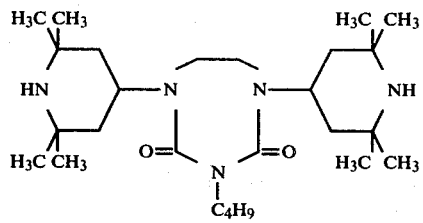

M.P. 151°–2° C.

Analysis for $C_{26}H_{49}N_5O_2$. Calculated: C 67.34%; H 10.65%; N 15.10%. Found: C 67.05%; H 10.52%; N 14.93%.

EXAMPLE 6

46.3 g (0.1 moles) of 1,5-bis(2,2,6,6-tetramethyl-4-piperidyl)-3-n-butyl-1,3,5-triazacycloheptane-2,4-dione prepared as in Example 5, 42.6 g (0.3 moles) of methyl iodide, 27.6 g (0.2 moles) of anhydrouspotassium carbonate and 200 ml of xylene are heated under reflux for 4 hours. The inorganic products are separated by filtration, and the filtrate is evaporated to dryness.

The residue obtained is crystallised from octane.

A compound is obtained of formula:

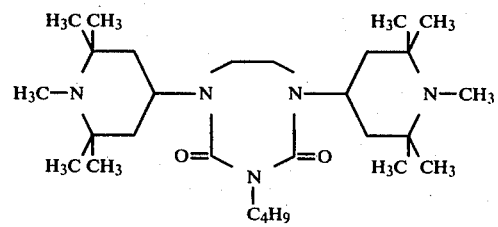

M.P. 172°–4° C.

Analysis for $C_{28}H_{53}N_5O_2$. Calculated: C 68.39%; H 10.86%; N 14.24%. Found: C 68.18%; H 10.71%; N 14.17%.

As stated at the beginning of this patent application, compounds of formula I are very effective in increasing the light, heat and oxidation resistance of synthetic polymers such as high and low density polyethylene, polypropilene, ethylene-propylene copolymers, ethylene-vinylacetate, copolymers, polybutadiene, polyisoprene, polystyrene, butadiene-styrene copolymers, acryl onitrile-butadiene-styrene copolymers, polymers and copolymers of vinyl chloride and vinylidene chloride, polyoxymethylene, polyurethanes, unsaturated polyesters, polyamides, polycarbonates, polyacrylates, alkyd resins and epoxy resins.

The compounds of formula I can be used in mixture with synthetic polymers in various proportions depending on the nature of the polymer, the final application and the presence of other additives. In general, it is suitable to use 0.01 to 5% by weight of the compounds of formula I with respect to the weight of the polymers, and preferably 0.1 to 1%.

The compounds of formula I can be incorporated into the polymer materials by various methods such as dry mixing in the form of a powder, or wet mixing in the form of a solution of suspension, or in the form of a master batch. In these operations, the synthetic polymer can be used in the form of a powder, granulate, solution, suspension or emulsion. The polymers stabilised with the products of formula I can be used for preparing moulded objects, film, narrow strips, fibres, monofilaments, lacquers and the like.

The mixtures of compounds of formula I with synthetic polymers are compatible with other additives for polymers such as antioxidants, UV absorbers, nickel stabilisers, pigments, fillers, plasticisers, antistatic agents, antifire agents, lubricants, anticorrosive agents and metal deactivators.

Examples of additives which can be used in mixture with the compounds of formula I are, in particular:

phenolic antioxidants, such as 2,6-di-tert-butyl-p cresol, 4,4'-thiobis(3-methyl-6-tert-butylphenol), 1,1,3-tris-(2-methyl-4-hydroxy-5-tertbutylphenyl)-butane, octadecyl3-(3,5-di-tert-butyl-4-hydroxyphenyl)propionate, pentaerythritol-tetra-(3,5-di-tert-butyl-4-hydroxyphenyl)propionate, tris-(3,5-di-tert-butyl-4-hydroxybenzyl)-isocyanurate, tris(4-tert-butyl-3-hydroxy-2,6-dimethylbenzyl)-isocyanurate;

secondary antioxidants such as esters of thiodipropionic acid, such as di-n-dodecyl-thiopropionate, di-n-octadecyl-thiodipropionate;

secondary antioxidants such as aliphatic sulphides and disulphides, such as di-n-dodecyl-sulphide, di-n-octadecyl-sulphide, di-n-octadecyl-disulphide, secondary antioxidants such as aliphatic, aromatic or aliphatic-aromatic phosphites and thiophosphites, such as tri-n-dodecylphosphite, tris-nonyl phenyl-phosphite, tri-n-dodecyl-trithiophosphite, phenyl-di-n-decyl-phosphite, di-n-octadecyl-pentaerythritol-diphosphite, tris-(2,4-di-t-butylphenyl)-phosphite, tetrakis-(2,4-di-tert-butylphenyl)-4,4'-diphenylenediphosphite;

UV absorbers such as 2-hydroxy-4-n-octoxybenzophenone, 2-hydroxy-4-n-dodecoxybenzophenone, 2-(2'-hydroxy-3',5'-di-tert-butylphenyl)-5-chlorobenzotriazole, 2-(2'-hydroxy-3',5'-di-tert-amylphenyl)-benzotriazole, 2,4-di-tert-butylphenyl-3,5-di-tert-butyl-4-hydroxybenzoate, phenylsalicylate, p-t-butylphenyl-salicylate, 2,2'-di-n-octoxy-5,5'-di-tert-butyloxanilide, 2-ethoxy-5-tert-butyl-2'-ethoxyanilide, ethyl-α-cyan-β,β-diphenylacrylate, methyl-α-cyan-β-methyl-4-methoxycinnamate;

nickel-based light stabilisers such as Ni-monoethyl-3,5-di-tert-butyl-4-hydroxybenzylphosphonate, butylamine-Ni-2,2'-thiobis-(4-t-octylphenolate) complex, Ni-2,2'-thiobis-4-tert-octylphenolphenolate), Ni-dibutyldithiocarbamate, Ni-3,5-di-tert-butyl-4-hydroxybenzoate, Ni complex of 2-hydroxy-4-n-octoxybenzophenone;

organostannic stabilisers such as dibutyltin-maleate, dibutyltinlaurate, dioctyltin-maleate;

metal salts of higher fatty acids such as calcium, barium, cadmium, zinc, lead, nickel stearates; calcium; cadmium, zinc, barium laurates;

organic and inorganic pigments such as Color Index Pigment Yellow 37, Color Index Pigment Yellow 83, Color Index Pigment Red 144, Color Index Pigment Red 48:3, Color Index Pigment Blue 15, Color Index Pigment Green 7, titanium dioxide, iron oxide and the like.

The effectivness of the products prepared according to the invention as stabilisers is illustrated in the following examples in which some of the products obtained in the examples of preparation are used in a synthetic polymer composition and subjected to stability tests. The results are given in comparison with those obtained adding known stabilisers available commercially.

EXAMPLE 7

2 g of each of the compounds indicated in Table 1 and 1 g of 2,6-di-tert-butyl-p-cresol (as antioxidant) dissolved in 100 ml of methanol are mixed with 1000 g of polypropylene MI=3.2 (Moplen C, produced by Montedison) and 1 g of calcium stearate.

The solvent is removed in an oven under vacuum at a temperature of 50° C. for 4 hours.

The dry mixture obtained is then extruded at a temperature of 200°–230° C. and transformed into granules, from which plates are obtained having a thickness of 0.2 mm by die-casting at 200° C. The plates are exposed in a 65 WR Weather-Ometer (ASTM G 27-70) with a black panel temperature of 63° C., and the increase in the content of carbonyl groups ($\Delta CO$) is checked periodically using the non-exposed samples for compensating the initial absorption of the polymer. The time (T 0.1) necessary for giving a $\Delta CO\% = 0.1$ at 5.85 μm is calculated.

As a comparison, a polymer plate without adding the stabilisers of the present invention is prepared, as is a plate adding 2 g of 2-hydroxy-4-n-octoxybenzophenone as light stabilisers, there plates being prepared under the same conditions.

Table 1 gives the results obtained.

TABLE 1

| Stabiliser | T 0.1 (hours) |
| --- | --- |
| Without light stabiliser | 210 |
| 2-hydroxy-4-n-octoxybenzophenone | 650 |
| Compound of example 1 | 1580 |
| Compound of example 3 | 1950 |
| Compound of example 4 | 2320 |
| Compound of example 5 | 1830 |
| Compound of example 6 | 1970 |

EXAMPLE 8

The polypropylene granules prepared as described in example 7 are transformed by extrusion into strips having a thickness of 40 μm and a width of 3 mm. The operating conditions are:
temperature of extruder: 230°–240° C.
temperature of head: 240° C.
stretching ratio: 1:6

The strips obtained are exposed in a 65 WR Weather-Ometer under the conditions indicated in example 7. Samples are withdrawn periodically, of which the residual toughness is measured by means of a constant speed dynamometer. The exposure time necessary for halving the initial toughness ($T_{50}$) is then evaluated. Table 2 shows the results obtained.

TABLE 2

| Stabiliser | $T_{50}$ (hours) |
|---|---|
| 2-hydroxy-4-n-octoxybenzophenone | 300 |
| Compound of example 1 | 1020 |
| Compound of example 3 | 1370 |
| Compound of example 4 | 1530 |
| Compound of example 5 | 1290 |
| Compound of example 6 | 1450 |

EXAMPLE 9

2 g of each of the compounds given in Table 3 dissolved in 100 ml of methanol are mixed with 1000 g of high density polyethylene of MI=0.32 (Moplen RO, produced by Montedison), 0.5 g of tris(3,5-di-tert-butyl-4-hydroxybenzyl)isocyanurate as antioxidant, and 1 g of calcium stearate. The solvent is removed in an oven under vacuum at a temperature of 50° C. for four hours. The dry mixture obtained is then extruded at a temperature of 190° C. and transformed into granules, from which plates of 0.2 mm thickness are obtained by die-casting at 200° C. The plates are exposed in a 65 WR Weather-Ometer with a black panel temperature of 63° C., and the increase in the content of carbonyl groups (ΔCO) is checked periodically, using the non-exposed samples for compensating the initial absorption of the polymer. The time (T 0.1) necessary for giving a ΔCO%=0.1 at 5.85 μm is calculated.

As a comparison, polymer plates are prepared under the same conditions as follows:
(a) without adding a light stabilisers
(b) with the addition of 2 g 2-hydroxy-4-n-octoxybenzophenone as a light stabiliser in place of the new stabilisers

TABLE 3

| Stabiliser | T 0.1 (hours) |
|---|---|
| Without light stabiliser | 320 |
| 2-hydroxy-4-n-octoxybenzophenone | 1000 |
| Compound of example 1 | >4000 |
| Compound of example 3 | >4000 |
| Compound of example 4 | >4000 |
| Compound of example 5 | >4000 |
| Compound of example 6 | >4000 |

EXAMPLE 10

2 g of each of the compounds listed in Table 4 are mixed with 1000 g of low density polyethylene of MI=0.26 (Fertene ZF 5-1800, produced by Montedison), 0.5 g of 2,6-di-tert-butyl-p-cresol (as antioxidant), and 1 g of calcium stearate in a low speed mixer.

The mixture obtained is then extruded at 190° C. and transformed into granules, from which plates having a thickness of 0.2 mm are obtained by die-casting at 200° C., these then being exposed in a Xenotest 150 (temperature of black panel 60° C.-DIN 54004). The time (T 0.5) necessary for giving an increase in the content of carbonyl groups, ΔCO%, of 0.5 at 5.85 μm is then determined.

As a comparison, polymer plates are prepared under the same conditions as follows:
(a) without adding light stabilisers
(b) with the addition of 2 g of 2-hydroxy-4-n-octoxybenzophenone as a light stabiliser.

Table 4 gives the results obtained.

TABLE 4

| stabiliser | T 0.5 (hours) |
|---|---|
| Without light stabiliser | 860 |
| 2-hydroxy-4-n-octoxybenzophenone | 1600 |
| Compound of example 1 | >4000 |
| Compound of example 3 | >4000 |
| Compound of example 4 | >4000 |
| Compound of example 5 | >4000 |
| Compound of example 6 | >4000 |

What we claim is
1. A compound of formula

in which:
$R_1$, $R_{12}$, which can be the same or different, represent —O, —CN, a hydrogen liner or branched alkyl containing 1 to 20 carbon atoms, an alkynl or alkinyl containing 2 to 20 carbon atoms, benzyl, benzyl substituted by 1 to 3 alkyls containing 1 to 4 carbon atoms, hydroxybenzyl, hydroxybenzyl substituted by 1 to 3 alkyls containing 1 to 4 carbon atoms; a —$COR_{15}$, —$COOR_{15}$ or —$CONR_{15}R_{16}$ radical in which $R_{15}$, $R_{16}$, which can be equal or different, represent a linear or branched alkyl containing 1 to 20 carbon atoms, an alkynl containing 2 to 20 carbon atoms, a cycloalkyl containing 5 to 12 carbon atoms anaralkyl containing, 7 to 12 carbon atoms an aryl containing 7 to 12 carbon atoms, or when bonded to N they can be hydrogen, or together with the N to which they are bonded can form a nitrogenous heterocyclic ring of 5 to 8 terms; or a $$-CH_2-\underset{R_{13}}{CH}-R_{14}$$

radical in which $R_{13}$ is hydrogen, methyl or phenyl, and $R_{14}$ is —OH, —CN,

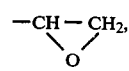

—$OR_{15}$, —$COOR_{15}$, —$COR_{15}$, —$OCOR_{15}$, —$CONR_{15}R_{16}$, —$OCONR_{15}R_{16}$, —$NR_{15}R_{16}$ in which $R_{15}$ and $R_{16}$ are as heretofore defined;

R2, R3, R6, R7, which can be equal or different, represent an alkyl containing 1 to 6 carbon atoms;

R4, R5, which can be equal or different, represent hydrogen or an alkyl containing 1 to 6 carbon atoms;

R8, R9, R10, R11, which can be equal or different, represent hydrogen or an alkyl containing 1 to 6 carbon atoms.

2. A compound as claimed in claim 1 in which R1, R12, which can be equal or different, are hydrogen or a linear or branched $C_1$–$C_6$ alkyl; R2, R3, R6, R7, which can be equal or different, are methyl or ethyl; R4, R5, which can be equal or different, are hydrogen or methyl; and R8, R9, R10, R11, which can be equal or different, are hydrogen or methyl.

3. A compound as claimed in claim 1 of formula

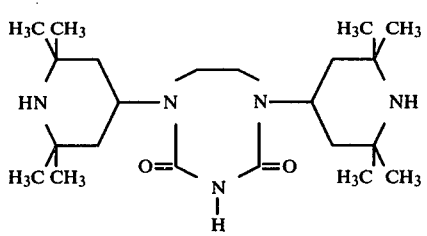

4. A compound as claimed in claim 1 of formula

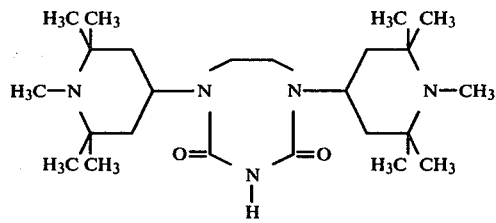

5. A compound as claimed in claim 1 of formula

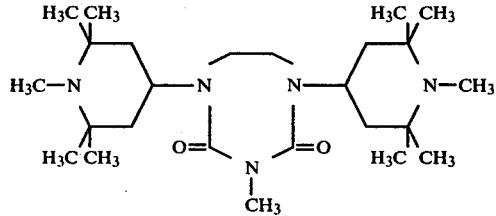

6. A compound as claimed in claim 1 of formula

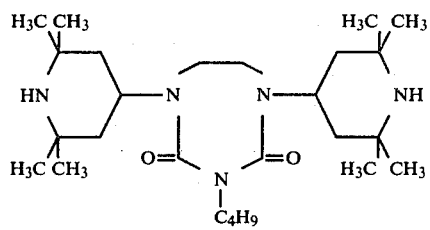

7. A compound as claimed in claim 1 of formula

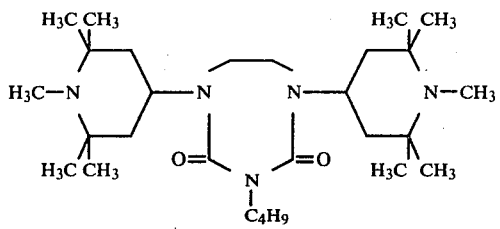

8. A compound as claimed in claim 1 of formula

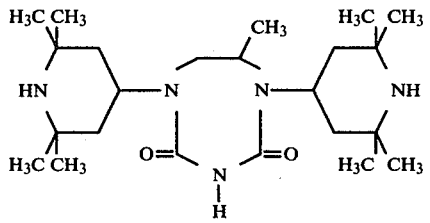

9. A compound according to claim 1 of the formula (I), wherein R2 and R6 are methyl, R4 is hydrogen or methyl, R5 denotes hydrogen and R3 and R7 represent a group —CH2—R4 wherein R4 is as defined above.

10. A compound according to claim 9 of the formula (I), wherein R2, R3, R6, R7 are methyl and R4 is hydrogen.

11. Polymer compositions stabilised against light, heat and oxidation, comprising a synthetic polymer and a stabilising compound of formula I as claimed in claim 1, in a quantity of 0.01 to 5%, and preferably 0.1 to 1%, by weight with respect to the weight of the synthetic polymer.

12. Polymer compositions as claimed in claim 11, which in addition to the stabilisers also comprise other normal additives for synthetic polymers.

13. Polymer compositions as claimed in claim 11, wherein the synthetic polymer is high density or low density polyethylene.

14. Polymer compositions as claimed in claim 11, wherein the synthetic polymer is polypropylene.

* * * * *